W. GRIKSCHEIT.
PRIMING CUP.
APPLICATION FILED APR. 16, 1919.
1,415,548.
Patented May 9, 1922.
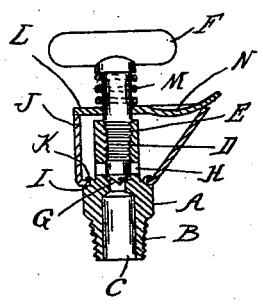
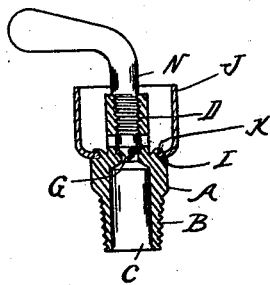
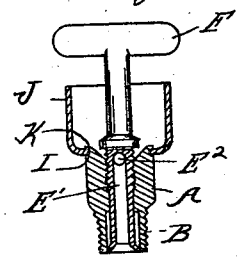
Inventor
William Grikscheit
By Whittemore Hulbert & Whittemore
Attorneys

UNITED STATES PATENT OFFICE.

WILLIAM GRIKSCHEIT, OF DETROIT, MICHIGAN.

PRIMING CUP.

1,415,548.  Specification of Letters Patent.  Patented May 9, 1922.

Application filed April 16, 1919. Serial No. 290,488.

*To all whom it may concern:*

Be it known that I, WILLIAM GRIKSCHEIT, a citizen of the United States of America, residing at Detroit, in the county of Wayne and State of Michigan, have invented certain new and useful Improvements in Priming Cups, of which the following is a specification, reference being had therein to the accompanying drawings.

The invention relates to priming cups and has for its object simplifying and cheapening the manufacture of the same. To this end the invention consists in the construction as hereinafter set forth.

In the drawings:

Figure 1 is a longitudinal section through one form of cup;

Figures 2 and 3 are similar views of slightly modified constructions.

It is usual in the construction of priming cups to provide a threaded nipple for engagement with the engine cylinder or other device to which the cup is attached, and also to provide a hollow threaded portion for engagement with the threaded stem of the shut-off valve. These portions are comparatively small in diameter, but the portion from which the cup proper is formed must necessarily be of greater diameter. Consequently the cups cannot be fashioned from bar stock without a very considerable waste of material, and if made from cast blanks the cost is increased and the material is apt to have flaws, involving a percentage of loss.

It is the principal object of the present invention to form the machined portions of the cup from bar stock of relatively small diameter and with little waste, and to form the hollow cup portion of pressed sheet metal.

As shown in Figure 1, A is a member machined from bar stock having a threaded nipple B at one end thereof and having an axial bore C therethrough. The opposite end of the member A from the nipple B is internally threaded at D to engage the threaded stem E of the valve member, which, as shown, is formed with a T-head F. Centrally within the member A is the valve seat G and above this seat is the transverse bore H. Adjacent to this transverse bore the member A is provided with a shoulder I for engaging the edge of a cupped sheet metal member J. There is also provided on the member A an annular fin or flange K which may be pressed down to secure and seal the joint between said member and the cup J. L is a cap member of pressed sheet metal which is apertured to be sleeved on the stem E, and M is a spring also sleeved on the stem E above the cap to yieldably hold the same in position. The cap L is provided with a rounded depression N which, when engaged with the cup, forms a centering device for the cap thereon.

The construction shown in Figure 2 is the same as that shown in Figure 1 with the omission of the cap L and spring M. The construction shown in Figure 3 differs from Figures 2 and 1 by placing the internally threaded portion below instead of inside the sheet metal cup, and by forming the stem E' hollow with a transverse aperture $E^2$ therein.

In all the various constructions when the valve is raised from its seat by the unscrewing of the stem there is a free and unobstructed passage for the liquid into the hollow nipple. This passage is formed in the construction shown in Figures 1 and 2 by the tranverse bores H which are above the valve seat, while in the construction shown in Figure 3 the passage is formed by the transverse bore $E^2$ in the valve stem communicating with the longitudinal passage in the stem E'. It will be noted that the liquid is not compelled to pass between the threads of the stem and socket, nor is there any necessity of milling or otherwise cutting away the stem to produce a clear channel. Thus the cost of construction is less than where milling operations are necessary, while due to the fact that the cup is attached to the member A after the machining thereof, there is nothing to interfere with the boring of the transverse aperture H. On the other hand, if the cup were formed integral with the nipple member it would be practically impossible to drill the transverse aperture H.

What I claim as my invention is:—

1. The combination of a member having an axial bore therethrough, externally threaded at one end and internally threaded at its opposite end, a valve member having a threaded portion for engaging the internal threads and a portion for engaging a seat upon said first-mentioned member, there being a transverse aperture in first named member above the seat when the valve is separated therefrom, and a sheet metal cup member of greater diameter than said first-mentioned member engaging the same, surrounding the portion having said transverse aperture.

2. The combination of a member having an axial bore therethrough, externally threaded at one end and internally threaded at its opposite end, of a valve member for engaging a seat and threaded to engage the internal threads of said first-mentioned member, there being a transverse aperture in one of said members which communicates with the axial passage when said valve is raised from its seat, and a sheet metal cup member of greater diameter than said first-mentioned member surrounding said transverse aperture and having a sealing engagement with said first-mentioned member.

3. The combination of a member having an axial bore therethrough, externally threaded at one end and internally threaded at its opposite end with a transverse bore intermediate its ends and a valve seat adjacent to said bore, a pressed sheet metal cup member of greater diameter than said first-mentioned member surrounding and seated upon said member beyond said transverse aperture, and a fin turned over the edge of said sheet metal member to retain the same to its seat and to seal the joint.

4. The combination of a member having an axial bore therethrough, externally threaded at one end, internally threaded at its opposite end, having a transverse bore intermediate its ends, an internal valve seat adjacent said transverse bore and an external annular shoulder also adjacent to said bore, a pressed sheet metal cup of greater diameter than said first-mentioned member engaging said shoulder, and a fin on said first-mentioned member engaging the edge of said sheet metal cup to retain the same and to seal the joint.

5. The combination of a member having an axial bore therethrough, externally threaded at one end, internally threaded at the opposite end, having a transverse bore intermediate its ends with an internal valve seat adjacent to said transverse bore and an external shoulder also adjacent to said bore, a pressed sheet metal cup member of greater diameter than said first-mentioned member engaging said external shoulder, a threaded stem engaging said internally threaded portion and having its inner end engaging said seat, a pressed sheet metal cap apertured to engage said stem and having a rounded depression for fitting within said cup, and a spring sleeved on said stem, bearing against said cap to yieldably hold the same in position.

In testimony whereof I affix my signature.

WILLIAM GRIKSCHEIT.